United States Patent
Seddigi et al.

(10) Patent No.: US 9,944,540 B2
(45) Date of Patent: Apr. 17, 2018

(54) PHOTOCATALYTIC DEGRADATION OF CONTAMINANT IN WASTE WATER USING LASER LIGHT SOURCE

(71) Applicant: Umm Al-Qura University, Makkah (SA)

(72) Inventors: Zaki S Seddigi, Makkah (SA); Saleh Abdel-Mgeed Ahmed Saleh, Makkah (EG); Alaa A. Nassif, Makkah (SA); Mohammed M Al-Thobaiti, Makkah (SA)

(73) Assignee: Umm-Al-Qura University, Makkah (SA)

( * ) Notice: Subject to any disclaimer, the term of this patent is extended or adjusted under 35 U.S.C. 154(b) by 480 days.

(21) Appl. No.: 14/596,084

(22) Filed: Jan. 13, 2015

(65) Prior Publication Data

US 2016/0200593 A1    Jul. 14, 2016

(51) Int. Cl.
| | | |
|---|---|---|
| C02F 1/30 | (2006.01) | |
| C02F 1/72 | (2006.01) | |
| C02F 1/00 | (2006.01) | |
| C02F 101/34 | (2006.01) | |

(52) U.S. Cl.
CPC ............. *C02F 1/30* (2013.01); *C02F 1/725* (2013.01); *C02F 2101/34* (2013.01); *C02F 2209/001* (2013.01); *C02F 2209/003* (2013.01); *C02F 2209/44* (2013.01); *C02F 2305/08* (2013.01); *C02F 2305/10* (2013.01); *Y02W 10/37* (2015.05)

(58) Field of Classification Search
CPC .......... C02F 1/30; C02F 1/00; C02F 2303/04; C02F 2303/00
USPC ......... 210/748.06, 748.01; 422/82.05, 82.01, 422/50
See application file for complete search history.

(56) References Cited

PUBLICATIONS

Siddiqui et al, Laser-based photo-oxidative degradation of methyl tertiary-butyl ether (MTBE) using zinc oxide (ZnO) catalyst, Journal of Environmental Science and Health Part A, 2011, 46, pp. 1154-1159. (Year: 2011).*

Zinc Oxide—From Synthesis to Application: A Review, Agnieszka Kotodziejczak-Radzimska * and Teofil Jesionowski, Materials 2014, 7, 2833-2881.

* cited by examiner

*Primary Examiner* — Christine T Mui
(74) *Attorney, Agent, or Firm* — Geeta Kadambi; Riddhi IP LLC

(57) ABSTRACT

The present disclosure relates to a rapid method of using a nanostructured zinc oxide (ZnO) catalyst for the photocatalytic degradation of a contaminant such as methyl tertiary-butyl ether (MTBE) in waste water. The degradation is carried out under a laser light wherein 100% MTBE gets degraded in a short time such as 20 minutes from the start of the irradiation.

16 Claims, 5 Drawing Sheets

PHOTOCATALYTIC DEGRADATION OF CONTAMINANT IN WASTE WATER USING LASER LIGHT SOURCE

FIELD OF TECHNOLOGY

The disclosure generally relates to a method of photocatalytic degradation of ether based compounds in waste water. More specifically, the present invention relates to a method of photocatalytic degradation of methyl tertiary-butyl ether (MTBE) in contaminated waste water using laser light.

BACKGROUND

A variety of treatment methods for removing contaminants from water involve adsorption on activated carbon, stripping with air, sterilization by chlorination or ozonization. All of these methods have some limitations for the removal of contaminant such as MTBE. Removal of adsorbed contaminant from the activated carbon requires incineration as well as typical drawbacks associated with the treatment of liquid streams on activated carbon beds. Photodegradation of contaminants by the action of solar and UV light is becoming more popular technique for water purification. Usually this technique is used in presence of metal oxide catalysts of the semiconductor type.

U.S. Pat. No. 7,341,863 to Vandenbergh describes a method of degradation of MTBE and tertiary-butyl alcohol (TBA) using a mixture bacteria (*Pseudomonas putida*) in contaminated water and/or soil. Bioremediation processes using such type of bacteria are limited by oxygen supply to the contaminated water or soil also these processes require precise control of environment and process conditions such as pH, temperature, and abundant supply of nutrients. However, there is no definite method to control MTBE's entry into the environment and also to degrade the already present MTBE contamination in the environment.

SUMMARY

The present invention discloses a method of a rapid photo-catalytic degradation of an ether based compound in waste water. More specifically, the present invention relates to a method of a rapid photo-catalytic degradation of MTBE in waste water using laser light.

In one embodiment, a synthesis process of a nanostructured zinc oxide (ZnO) catalyst is disclosed. In another embodiment, a synthesis of a nanostructured ZnO catalyst by precipitation method is disclosed. The process as disclosed comprise of mixing of a zinc nitrate hexahydrate and an ammonium carbonate to form an aqueous solution. The aqueous solution as formed is mixed in molar ratios by continuously stirring at a room temperature. The mixing results in a formation of a precipitate wherein the prepared precipitate is a precursor of ZnO. The precipitate thus formed is separated by centrifugation, is thoroughly washed with a de-ionized waste water followed by washing with an ethanol solution. The precipitate or the precursor of ZnO is then dried in air to form a dried precipitate which is then subjected to a calcination process to form a nanostructured ZnO catalyst. The average crystalline size of ZnO range from 100-300 nm such as 200 nm.

In one embodiment, a method of using the synthesized nanostructured ZnO catalyst for degradation of MTBE is disclosed. In another embodiment, a method of using the synthesized nanostructured ZnO catalyst for the degradation of MTBE using laser light is disclosed. In some embodiments, a method of using the synthesized nanostructured ZnO catalyst for the degradation of MTBE using monochromatic source emitting in the 300-450 nm region is disclosed.

In one embodiment, a laser-based photocatalytic setup for degradation of MTBE is disclosed. In another embodiment, a laser based photocatalytic setup for removal of MTBE in waste water or other contaminant source is disclosed. The setup as disclosed comprise of a Pyrex® cell or a borosilicate glass container (or just stated as container), a laser system and an analytical instrumentation. The Pyrex® cell as disclosed further comprise of a catalyst, a contaminant solution and a magnetic bar. The laser system comprise of a laser light source and a quartz window. Analytical instrument as disclosed in the setup is connected to the Pyrex® cell or a borosilicate glass container and is used to determine a concentration of MTBE in solution before and after the laser light irradiation.

In one embodiment, a method of using a metal oxide catalyst for a photocatalytic degradation of a contaminant comprises: pouring an aqueous contaminated solution into a borosilicate glass container; placing the metal oxide catalyst into the borosilicate glass container; placing a magnetic bar into the borosilicate glass container; collecting a sample to determine an initial concentration ($C_1$) of the contaminant; irradiating the solution with a laser light for a specific time period; recollecting the sample to determine subsequent concentration ($C_2$) of the contaminant whereas the difference in concentration of $C_1$ and $C_2$ will determine the amount of contaminant degraded. In another embodiment, a method of using nanostructured ZnO catalyst for photocatalytic degradation of MTBE comprises: pouring an aqueous MTBE contaminant solution into a borosilicate glass container; placing a nanostructured ZnO catalyst into the borosilicate glass container; placing a magnetic bar into the borosilicate glass container, wherein the magnetic bar helps in continuous stirring of the solution when placed over a stirrer; collecting a sample to determine an initial concentration ($C_1$) of MTBE; irradiating the solution with a laser light for a specific time period; recollecting the sample to determine subsequent concentration ($C_2$) of MTBE whereas the difference in concentration of $C_1$ and $C_2$ will determine the amount of MTBE degraded. The catalyst as disclosed may be added before the laser light exposure or following the laser light exposure.

In one embodiment Nd:YAG laser light source is used whereas in another embodiment a suitable laser light source may be used. The samples as collected may be analyzed using a gas chromatography equipped with a flame ionization detector or other known and routinely used analytical instruments.

The methodology of using a catalyst for a photocatalytic degradation of a contaminant such as MTBE in waste water using a laser light, disclosed herein, may be implemented in any means for achieving various aspects. Other features will be apparent from the accompanying Figures and from the detailed description that follows.

BRIEF DESCRIPTION OF THE DRAWINGS

Example embodiments are illustrated by way of example and no limitation in the graph and in the accompanying Figures, like references indicate similar elements and in which.

Figure 1:
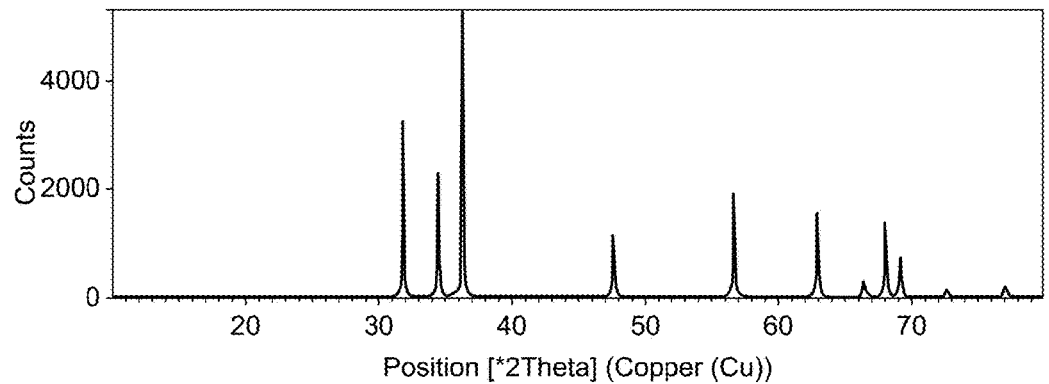
FIG. 1 shows a XRD diffractogram of nanostructured ZnO catalyst.

Other features of the present embodiments will be apparent from the accompanying detailed description that follows.

DETAILED DESCRIPTION

The present disclosure relates to a method of photocatalytic degradation of a contaminant such as MTBE in waste water by irradiating with a laser light.

A number of studies have been done showing a catalytic degradation of MTBE. U.S. Pat. No. 6,468,434 relates to a photo-degradative process for the purification of water contaminant such as MTBE or its analog using a catalyst under UV light source. However, the degradation process takes place in few hours and requires oxygen saturation of the sample. U.S. Pat. No. 6,197,206 disclose a method and apparatus for purifying MTBE contaminated water by bubbling an oxidizing gas into water and then stripping the oxidized gas and MTBE from the water. However, the process requires ozone gas and thus very complex apparatus to work on. Further, Siddiqui & Gondal (2011) discloses a laser based photo-oxidation degradation of MTBE using ZnO catalyst. However the laser energy used and the time of irradiation is very high and long respectively which add to the complexity of the process.

The present application provides a simple and a rapid process of photo-degradation of contaminant such as MTBE in waste water. The process utilizes nanostructured ZnO as a catalyst and the sample is irradiated for a very short duration of time for complete degradation of MTBE. The details of the process as follows.

Catalyst

The catalyst as used in the present application is nanostructured ZnO catalyst. The catalyst is prepared via a precipitation method. The precipitation method as disclosed comprise of mixing zinc nitrate hexahydrate and the ammonium carbonate in equal molar ratios (molar ratios 1:1) to form an aqueous solution. The aqueous solution of zinc nitrate hexahydrate and the ammonium carbonate is continuously stirred at a room temperature for a time range of 1-4 hours preferably 2 hours. The room temperature may vary from 20° C. to 29° C. Continuous stirring will form a precipitate which is then separated by centrifugation. The prepared precipitate act as precursor of ZnO and were thoroughly washed with de-ionized waste water and then with ethanol. The prepared precursor were dried in air at a temperature of 100° C. overnight. A user may dry the precipitate at other temperature ranging from 80° C. to 150° C. Further, the dried precipitate is subjected to calcination to form a nanostructured ZnO catalyst. The calcination as disclosed is done at a temperature of 500° C. for 6 hours at a heating rate of 1° C./min to obtain nanostructured ZnO catalyst. The calcination of the dried precipitate may also be done at a temperature range of 300° C. to 700° C. for 4 to 8 hours to obtain a nanostructured ZnO catalyst. The average crystalline size of ZnO range from 100-300 nm such as 200 nm.

Thus, the steps of a synthesis of a nanostructured ZnO catalyst comprise of mixing a molar ratio of a zinc nitrate hexahydrate and an ammonium carbonate to form an aqueous solution; stirring the aqueous solution continuously at a room temperature to form a precipitate; separating the precipitate by centrifugation; washing the precipitate with a de-ionized waste water followed by washing with an ethanol solution; drying the precipitate in air overnight to form a dried precipitate; calcinating the dried precipitate to obtain a nanostructured ZnO catalyst. The nanostructured ZnO catalyst as synthesized and used in the present application can be reused after simple regeneration process of drying and heating in air at 400° C.-500° C. preferably 200° C.

The catalyst as synthesized above was further characterized using an advance instrumentation techniques such as a XRD diffractometer, Scanning electron microscopy (SEM) and Transmission electron microscopy (TEM) studies.

Figure 2:
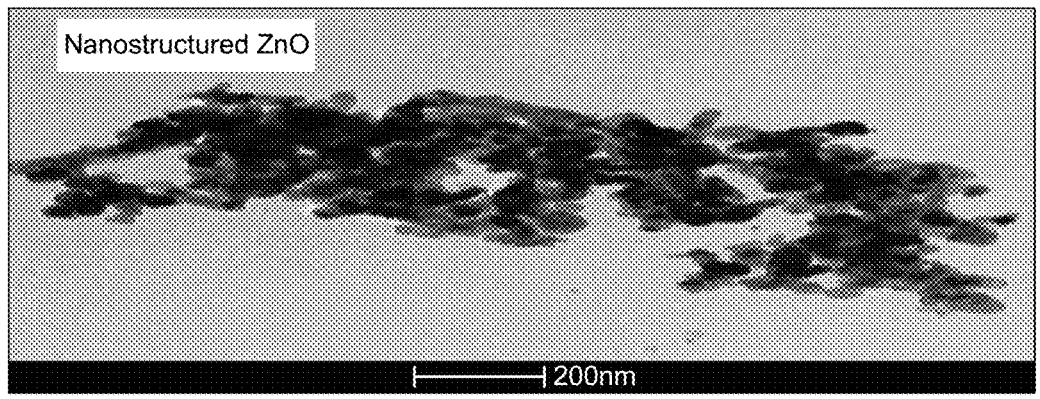
FIG. 2 shows a TEM image of nanstructured ZnO catalyst.
Figure 3:
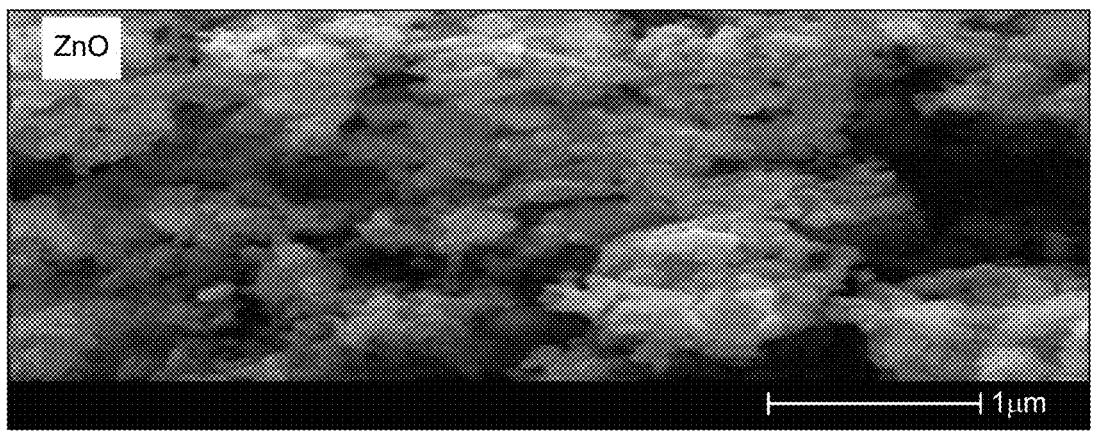
FIG. 3 shows a SEM image of nanostructured ZnO catalyst.

FIG. 1 shows XRD diffractogram of nanostructured ZnO catalyst using a XRD diffractometer. The crystalline structure of the nanostructured ZnO catalyst was characterized by a rotating-target X-ray diffractometer (Japan Rigaku D/Max-2400) equipped with a monochromatic high-intensity Cu K radiation (=1.5418 Å, 40 kV, 100 mA). The morphology of disclosed and synthesized catalyst (nanostructured ZnO) is observed by TEM studies as well as by SEM studies as shown in FIGS. 2 and 3 respectively.

Figure 4:
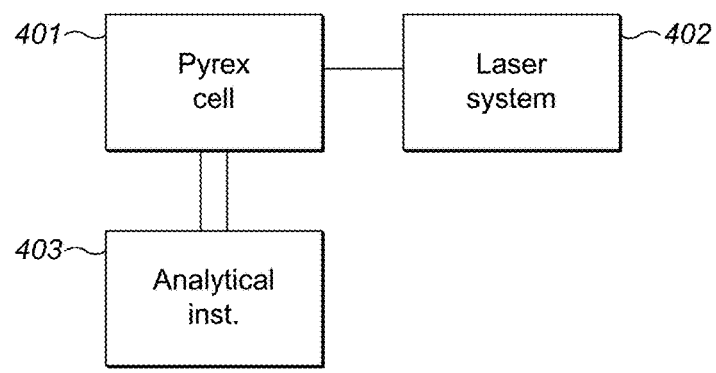
FIG. 4 shows a setup for laser based photocatalytic degradation of MTBE.
Figure 5:
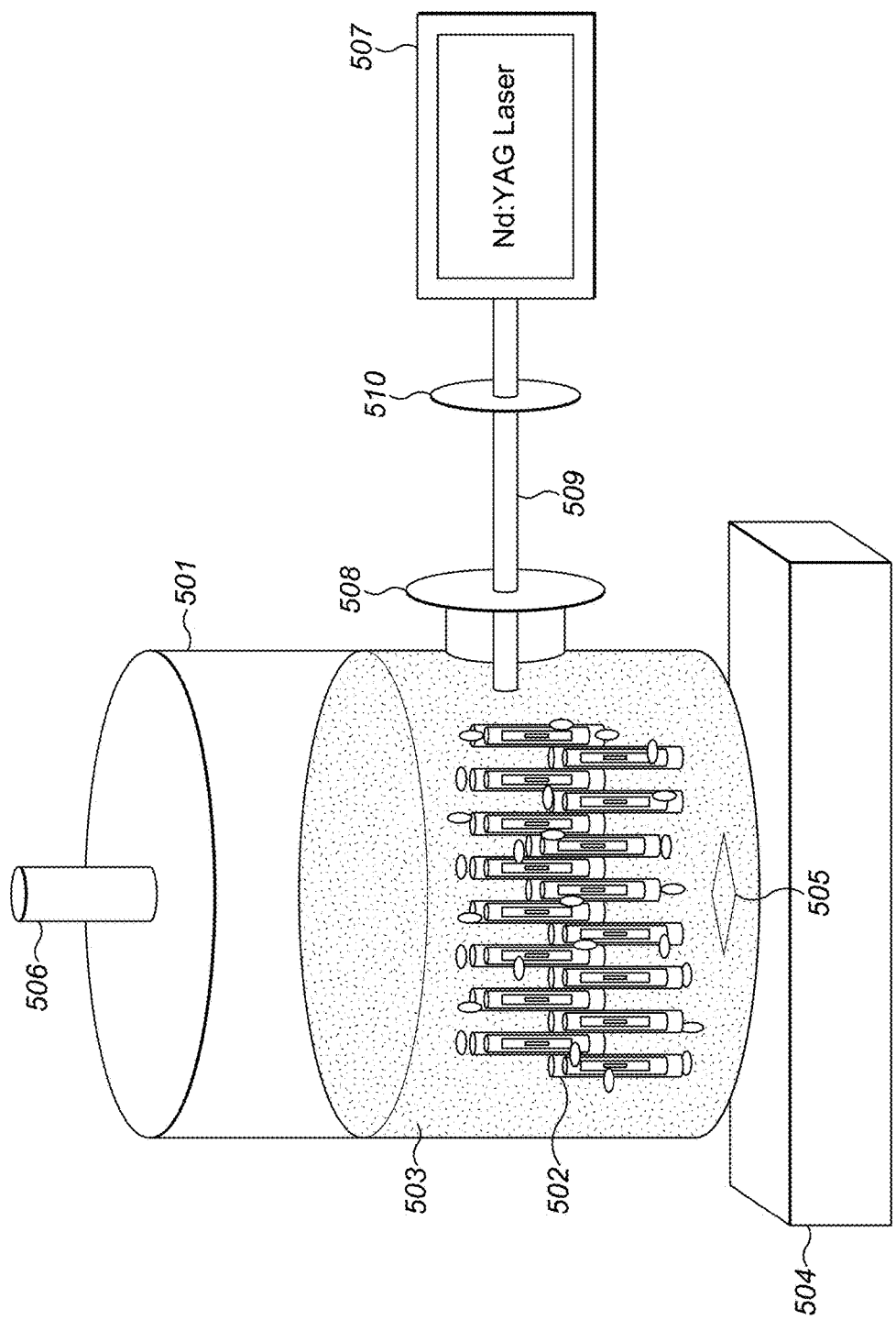
FIG. 5 shows a detailed setup for laser based photocatalytic degradation of MTBE.

Setup for Laser Based Photocatalytic Degradation of a Contaminant in Waste Water A simple setup was developed to carry out laser based photocatalytic degradation of contaminant in waste water using the synthesized catalyst. The setup as disclosed and shown in FIG. 4 comprise of a Pyrex® cell or a borosilicate glass container 401; a laser system 402 and an analytical instrumentation 403. Further, as shown in FIG. 5, the Pyrex® cell or a borosilicate glass container comprise of a borosilicate glass container 501 with at least one catalyst rod 502 filled with a contaminant solution 503 poured into and out of the borosilicate glass container through an outlet 506. The borosilicate glass container further comprise of a magnetic bar 505 placed at the bottom of the borosilicate glass container. The borosilicate glass container is placed on a stirrer 504 so that the solution is stirred continuously. On one side of the borosilicate glass container is a quartz window 508 and a plate 510 followed by the Nd:YAG laser light source 507 making up the laser system 402. The quartz window and the plate help in streaming a uniform laser beam 509 onto the solution 503. The catalyst can be placed into the solution as a rod or any other desired manner. The laser energy as used in the disclosed application range from 20-60 mJ or from 30-50 mJ. Further, the Pyrex® cell or a borosilicate glass container as disclosed is 8-12 cm long with 4-10 cm in diameter.

Thus, the laser system 402 as disclosed comprise of a laser light source 507 such as a third harmonics from Nd:YAG laser along with a plate 510 and a quartz window 508 mounted outside of the container 501 to uniform the laser beam 509 but without focusing the laser beam inside of the cell. The analytical instrumentation 403 as disclosed is used to analyze the MTBE concentration before, after and in between the laser light irradiation. The analytical instrument may be a gas chromatography equipped with a flame ionization detector. Any other analytical instrument may also be used for analyzing MTBE concentration. The analytical instrument may be connected to the Pyrex® cell or a borosilicate glass container so as to collect samples before the irradiation of the solution, while the irradiation is active and once the irradiation is complete to analyze the final concentration of MTBE in the solution.

The presently disclosed method can also be used for the degradation of MTBE using monochromatic source emitting in the 300-450 nm region is disclosed.

Figure 6:
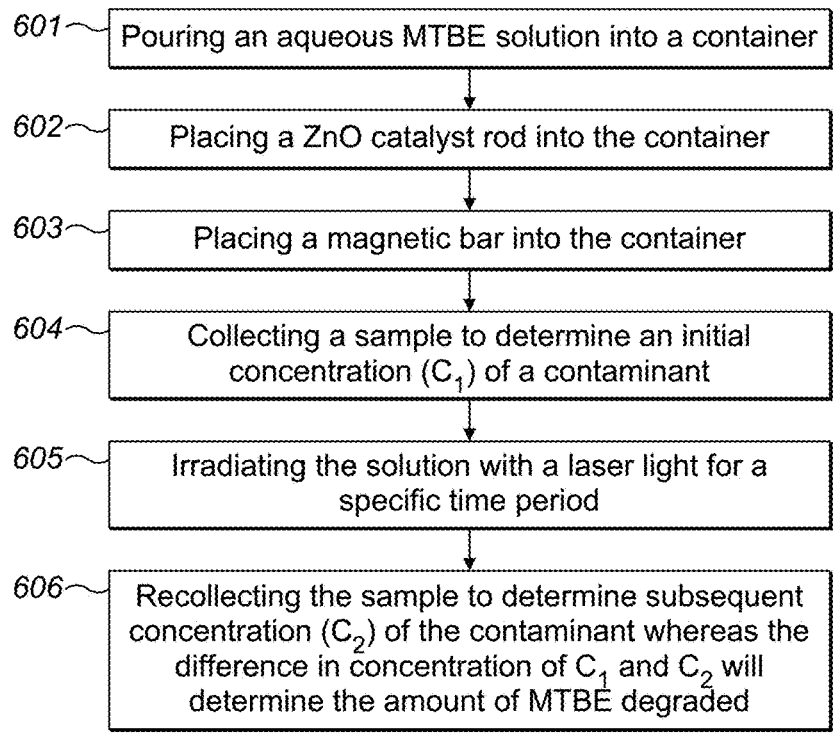
FIG. 6 shows a stepwise method of using nanostructured ZnO catalyst for a photocatalytic degradation of MTBE using laser light.

As shown in FIG. 6, a stepwise methodology of using the nanostructured ZnO catalyst for a photocatalytic degradation of MTBE comprise of: pouring an aqueous MTBE solution into a container 601; placing a ZnO catalyst rod into the container 602; placing a magnetic bar into the container 603; collecting a sample to determine an initial concentration ($C_1$) of a contaminant 604; irradiating the solution with a laser light for a specific time period 605; recollecting the sample to determine subsequent concentration ($C_2$) of the contaminant whereas the difference in concentration of $C_1$ and $C_2$ will determine the amount of MTBE degraded 606.

EXAMPLES

The present embodiments are being described with reference to a specific example embodiment and is included to illustrate but not limit the scope of the invention.

Example 1

In the present experiment, 100 mg of nanostructured ZnO catalyst was used for the photocatalytic degradation of MTBE in waste water. A control solution was also run missing the catalyst. The contaminated solution was poured into the container through the outlet. A magnetic bar was placed at the bottom of the container and the container was placed on a stirrer for continuous stirring of the solution during the full run of the experiment.

Figure 7:
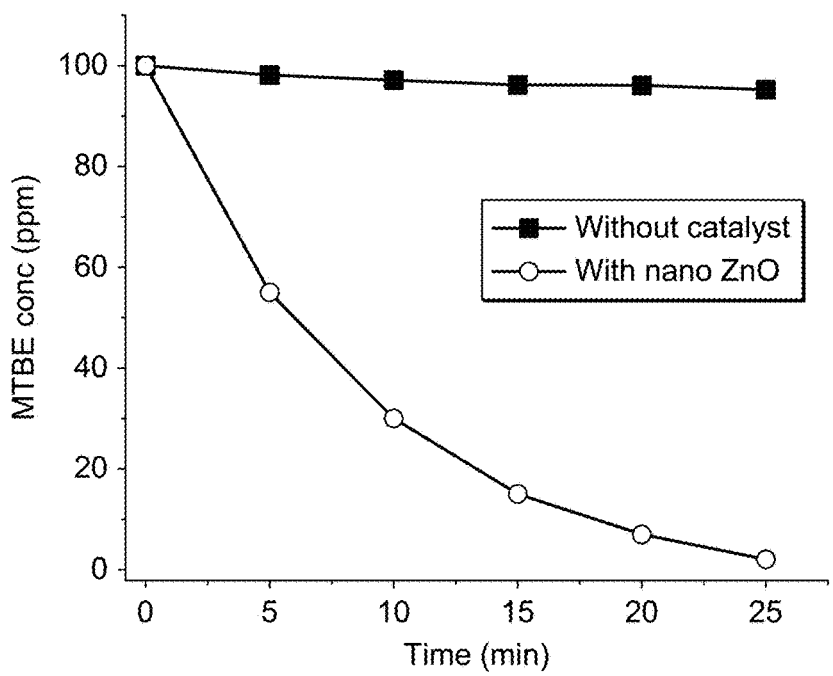
FIG. 7 shows MTBE photocatalytic degradation under laser irradiation condition.

A sample was first collected before the start of the experiment to determine the initial concentration of MTBE in the solution. Both the test solution exposed to the catalyst and the control solution minus the catalyst were irradiated with laser light for a specific time period. Samples were collected after every five minutes and analyzed for MTBE concentration using the analytical instrumentation. The process was carried outs for a total of 25 minutes. The results are shown in FIG. 7 and as can be seed from the Figure, 100% MTBE was degraded within 20-25 minutes of laser light irradiation.

Thus, the present disclosure relates to a photocatalytic degradation of MTBE in waste water under the laser light.

INDUSTRIAL APPLICABILITY

Figure 8:
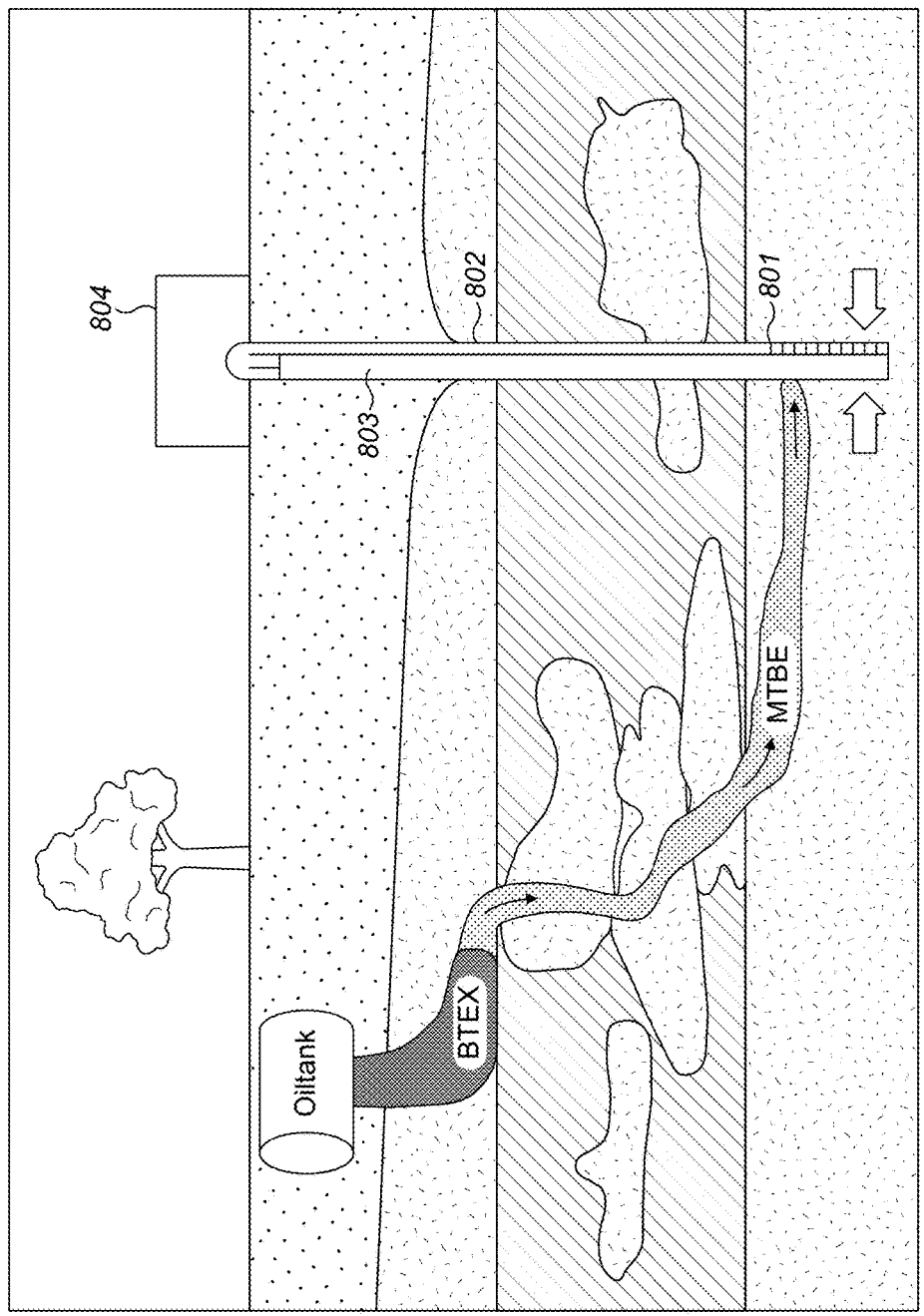
FIG. 8 shows a suggested diagrammatic presentation for degradation of MTBE under laser light.

As shown in FIG. 8, the disclosed methodology of photocatalytically degradation can be utilized for MTBE degradation in underground waste water source. To carry out the methodology, a hole can be made up till the source of waste water 801 and column of glass fiber 802 can be inserted into the hole. The column can be mounted from inside through a nanostructured ZnO photocatalyst in the form of a ZnO tape 803. A laser machine 804 for the laser light source may be mounted as the outer covering over the hole for the laser light irradiation. The column 802 can be mounted such that as the contaminated waste water pass underneath the column or in close proximity to column it is irradiated with the laser light in the presence of ZnO catalyst for MTBE degradation.

While the present disclosure has been described with reference to an exemplary embodiment, changes may be made within the purview of the appended claims, without departing from the scope and spirit of the present disclosure in its aspects. Also, although the present disclosure has been described herein with reference to particular materials and embodiments, the present disclosure is not intended to be limited to the particulars disclosed herein; rather, the present disclosure extends to all functionally equivalent structures, methods and uses, such as are within the scope of the instant claims. Accordingly, the specification and drawings are to be regarded in an illustrative rather than in a restrictive sense.

What is claimed is:

1. A laser based photocatalytic setup, comprising:
    a borosilicate glass container having a contaminated waste water solution;
    a laser system;
    a catalyst rod containing a ZnO catalyst of 100-200 nm particle size, wherein the catalyst is made using zinc nitrate hexahydrate and the ammonium carbonate in equal molar ratios and calcining at 500° C. to form ZnO as the ZnO catalyst and placed inside the borosilicate glass container; and
    an analytical instrumentation for a laser based photocatalytic degradation of a contaminant in waste water.

2. The setup of claim 1, wherein the laser system has a laser light source, a plate and a quartz window mounted outside of the borosilicate glass container.

3. The setup of claim 2, wherein the laser source is a third harmonics from Nd:YAG laser.

4. The setup of claim 1, wherein the analytical instrumentation is gas chromatography equipped with a flame ionization detector.

5. The setup of claim 1, wherein the contaminant to be degraded is methyl tertiary-butyl ether (MTBE).

6. The setup of claim 1, wherein the setup is used for a laser based degradation of MTBE in waste water.

7. The setup of claim 1, wherein the contaminant in waste water is irradiated with the laser source for 20 minutes.

8. A laser based photocatalytic setup, comprising:
    a column of glass fiber to be inserted underground where a contaminated water containing methyl tertiary-butyl ether (MTBE) is present;
    a catalyst tape containing a nanostructured ZnO catalyst of 100-200 nm particle size is packed inside the column of glass fiber, wherein the catalyst is made using zinc nitrate hexahydrate and the ammonium carbonate in equal molar ratios and calcining at 500° C. to form ZnO as the ZnO catalyst; and
    a laser machine for a laser light source is mounted as the outer covering over the column of glass fiber for a laser light induced irradiation of MTBE in presence of the nanostructured ZnO catalyst by degrading the MTBE in the contaminated water.

9. The claim of 8, wherein an initial concentration ($C_1$) of MTBE is collected for the contaminated water; and
    subsequent concentration ($C_2$) of MTBE is collected after the irradiation process, whereas the difference in concentration of $C_1$ and $C_2$ will determine the amount of MTBE degraded.

10. A method of using a metal oxide catalyst for a photocatalytic degradation of a contaminant comprises:
    pouring an aqueous contaminated solution into a container;
    placing the metal oxide catalyst into the container wherein the metal oxide catalyst is a zinc oxide (ZnO) catalyst of 100-200 nm particle size, wherein the catalyst is made using zinc nitrate hexahydrate and the ammonium carbonate in equal molar ratios and calcining at 500° C.;

placing a magnetic bar into the container;

collecting a sample to determine an initial concentration ($C_1$) of the contaminant;

irradiating the solution with a laser light for a specific time period;

recollecting the sample to determine subsequent concentration ($C_2$) of the contaminant whereas the difference in concentration of $C_1$ and $C_2$ will determine the amount of contaminant degraded.

11. The method of claim 10, wherein the contaminant to be degraded is methyl tertiary butyl ether (MTBE).

12. The method of claim 10, wherein the ZnO catalyst is a nanostructured ZnO catalyst.

13. The method of claim 10, wherein the concentration of the contaminant is determined using a gas chromatography.

14. The method of claim 10, wherein the solution is irradiated with the laser light for 25 minutes.

15. The method of claim 10, wherein the solution is irradiated with the laser light for 20 minutes.

16. The method of claim 10, wherein the magnetic bar helps in continuous stirring of the solution when placed on a stirrer.

* * * * *